(12) United States Patent
Glazebrook

(10) Patent No.: US 12,234,100 B2
(45) Date of Patent: Feb. 25, 2025

(54) DIVERTER ASSEMBLY

(71) Applicant: Proseal UK Limited, Adlington (GB)

(72) Inventor: Tom Glazebrook, Buxton (GB)

(73) Assignee: Proseal UK Limited, Adlington (GB)

( * ) Notice: Subject to any disclaimer, the term of this patent is extended or adjusted under 35 U.S.C. 154(b) by 378 days.

(21) Appl. No.: 17/594,422

(22) PCT Filed: Apr. 15, 2020

(86) PCT No.: PCT/GB2020/050954
§ 371 (c)(1),
(2) Date: Oct. 15, 2021

(87) PCT Pub. No.: WO2020/212694
PCT Pub. Date: Oct. 22, 2020

(65) Prior Publication Data
US 2022/0185594 A1    Jun. 16, 2022

(30) Foreign Application Priority Data
Apr. 17, 2019  (GB) ..................................... 1905453

(51) Int. Cl.
*B65G 43/08*   (2006.01)
*B65G 47/71*   (2006.01)
*B65G 47/76*   (2006.01)

(52) U.S. Cl.
CPC ............. *B65G 43/08* (2013.01); *B65G 47/71* (2013.01); *B65G 47/766* (2013.01); *B65G 2201/0258* (2013.01); *B65G 2203/025* (2013.01)

(58) Field of Classification Search
CPC ...... B65G 43/08; B65G 47/71; B65G 47/766; B65G 2203/025; B65G 2203/2201; B65G 2203/0258
(Continued)

(56) References Cited

U.S. PATENT DOCUMENTS 3,193,078 A  *  7/1965  Amenta ................. B65G 47/71
                                                          53/244
3,326,349 A  *  6/1967  Pettis ...................... B65G 47/71
                                                          198/597
(Continued)

FOREIGN PATENT DOCUMENTS

| BE | 1 016 367 A3 | 9/2006 |
| FR | 2 433 375 A1 | 3/1980 |
| JP | 2949344 B2 | 9/1999 |

OTHER PUBLICATIONS

International Search Report mailed Jun. 29, 2020, issued in corresponding International Application No. PCT/GB2020/050954, filed Apr. 15, 2020, 5 pages.
(Continued)

*Primary Examiner* — James R Bidwell
(74) *Attorney, Agent, or Firm* — Christensen O'Connor Johnson Kindness PLLC

(57) ABSTRACT

A diverter assembly (25) is provided for guiding articles from a single lane (54) to one of a plurality of lanes (13, 14). The assembly (25) has a pair of spaced apart guides (30) defining a guide channel (49) therebetween. The guides (30) are connected to a rotatably mounted support (24). A first actuator (22, 23) is provided operable to rotate the support (24) to pivot the guides (30), and thereby cause articles to be guided to a selected one of the plurality of lanes.

17 Claims, 6 Drawing Sheets

(58) Field of Classification Search
USPC .......................................................... 198/442
See application file for complete search history.

(56) References Cited

U.S. PATENT DOCUMENTS

| | | | | |
|---|---|---|---|---|
| 3,822,006 A * | 7/1974 | Shuttleworth | ........... | B65B 35/44 |
| | | | | 198/442 |
| 3,848,746 A * | 11/1974 | van der Winden | .... | B65G 47/71 |
| | | | | 198/525 |
| 4,066,163 A * | 1/1978 | Rowekamp | ............. | B65B 21/04 |
| | | | | 198/442 |
| 4,147,248 A | 4/1979 | Kurczak et al. | | |
| 4,723,649 A | 2/1988 | Hartness et al. | | |
| 5,174,430 A * | 12/1992 | Ebira | ..................... | B65G 47/71 |
| | | | | 198/442 |
| 5,441,142 A * | 8/1995 | Schneider | .............. | B65G 47/71 |
| | | | | 198/456 |
| 5,944,165 A * | 8/1999 | Mannlein | ................ | B65G 47/71 |
| | | | | 198/367 |
| 6,772,872 B2 * | 8/2004 | Spangenberg | ........ | B65G 47/682 |
| | | | | 198/442 |
| 8,807,319 B2 * | 8/2014 | Borghi | ................. | B65G 47/715 |
| | | | | 198/429 |
| 9,783,375 B2 | 10/2017 | Parker et al. | | |
| 2021/0032049 A1 * | 2/2021 | Hicks | ..................... | B65G 27/04 |

OTHER PUBLICATIONS

Written Opinion mailed Jun. 29, 2020, issued in corresponding International Application No. PCT/GB2020/050954, filed Apr. 15, 2020, 7 pages.

First Examination Report mailed Jun. 18, 2021, issued in corresponding GB Application No. 1905453.5, filed Apr. 17, 2019, 2 pages.

Communication Pursuant to Article 94(3) EPC mailed May 6, 2024, issued in corresponding European Patent Application No. 20 721 694.6, filed Nov. 17, 2021, 8 pages.

* cited by examiner

DIVERTER ASSEMBLY

TECHNICAL FIELD OF THE INVENTION

The present invention relates to a diverter assembly. In particular, the present invention relates to a diverter assembly for guiding articles from a single lane to one of a plurality of lanes.

BACKGROUND TO THE INVENTION

A packaging production line typically comprises a plurality of conveyors which advance containers along the line. One or more machines may be provided along the line to perform a required function.

The throughput of machinery upstream in the production line may be higher than that of the machinery downstream. Where this is the case, it is often advantageous to divide the production line from a single lane into a plurality of lanes so that the workload can be more appropriately managed by the machinery provided downstream. In order to distribute containers from the single lane among the plurality of lanes, the production line may comprise a diverter assembly.

In an existing diverter assembly, described in U.S. Pat. No. 7,845,486, a pair of flexible guide walls guide product along a conveyor from a single lane to one of three lanes. Outfeed ends of the guide walls are coupled to a yoke member extending from an x-y carriage system mounted above the conveyor at its outfeed end. The carriage system moves the guide walls across the conveyor to divert product from the single lane to one of three lanes. The carriage system also moves the guide walls to and fro along the direction of travel of the conveyor to avoid the need to either pause the conveyor or build a gap into the flow of containers to accommodate switching between the three lanes. Each guide wall is coupled to a coil assembly comprising a rotatable torsion spring. As the carriage system moves the guide walls, a portion of the wall is taken up by or fed out from the coil assembly to shorten or lengthen the wall as necessary.

The carriage assemblies comprised in the x-y carriage system obstruct the outfeed end of the conveyor. This makes it difficult to clean and maintain the conveyors near the outfeed end, where it is most likely for spillage and blockage to occur.

It is an object of embodiments of the present invention to provide an improved diverter assembly and/or to address one or more of the problems discussed above.

SUMMARY OF THE INVENTION

According to a first aspect of the present invention there is provided a diverter assembly for guiding articles from a single lane to one of a plurality of lanes, the assembly comprising: a pair of spaced apart guides defining a guide channel therebetween, the guides being connected to a rotatably mounted support, and a first actuator operable to rotate the support to thereby pivot the guides via the support and thus cause articles to be guided to a selected one of the plurality of lanes.

Such a construction allows the guides to be pivoted by rotation of the rotatably mounted support, whilst the support remains mounted in a fixed location. The guide channel is thereby pivoted to guide articles to a selected one of the plurality of lanes without the need for lateral movement of the support. It is therefore not necessary to provide means for laterally moving the support. Advantageously, this construction also allows the axis of rotation of the support to be located toward the single lane. As a result, the end of the guides toward the plurality of lanes may be unobstructed. This facilitates cleaning and maintenance of the assembly and the area surrounding said end of the guides.

The diverter assembly may be arranged to guide articles to one of 2, 3, 4, 5, 6 or more lanes.

The guides may be substantially supported by the support. Such a construction is advantageous as the guides need not be provided with substantial further means for supporting, which would otherwise add to the mass which must be moved by the first actuator, or may increase constructional complexity. The guides may be wholly supported by the support. The guides may be suspended from the support.

Advantageously, rotational movement of the support directly results in rotational movement of the guides. Where no further means for supporting the guides need be provided, this allows the end of the guides toward the plurality of lanes to remain unobstructed.

The first actuator may be rotatable to rotate the support. The first actuator may comprise a rotary actuator. Advantageously, a rotary actuator has a small footprint, which helps to ensure that the guides and guide channel are largely unobstructed. The rotary actuator may comprise a motor and a gearbox. The output of the gearbox may connect to or comprise the support. The motor may be a servomotor and the gearbox may be a planetary reduction gearbox.

The support may be positioned above the guides. Thus, the guides may be suspended from the support above, such that the support does not obstruct the guide channel below. The axis of rotation of the support may be centrally positioned between the guides. The axis of rotation of the support may be substantially adjacent the single lane. As a result, the end of the guide channel closest the single lane remains in substantially the same location throughout pivoting of the guides. This is advantageous as articles directed to this location will enter the guide channel.

At least part of the guides may be movable radially relative to the axis of rotation of the support. Articles which travel through the guide channel may thereby be caused to remain within the guide channel for an extended time period. Advantageously, this facilitates switching of the diverter assembly from one of the plurality of lanes to another of the plurality of lanes without the need to introduce a gap into the flow of articles. The assembly may be operable to cause at least part of the guides to move radially relative to the axis of rotation of the support as the guides pivot. Advantageously, this allows the diverter assembly to switch between lanes when an article is near the end of the guide channel.

The assembly may further comprise a second actuator connected to the guides and operable to cause at least part of the guides to move radially relative to the axis of rotation of the support.

The second actuator may be mounted to the support for rotation with the support.

The second actuator may be substantially or wholly supported by the support. The second actuator may be suspended from the support. Where no further means for supporting the second actuator is provided, this allows the end of the guides toward the plurality of lanes to remain unobstructed.

A yoke may be movably mounted to the second actuator. At least part of the guides may be connected to the yoke. Advantageously, the second actuator is thereby operable to cause simultaneous movement of both guides.

The second actuator may be housed in a body. A part of the body may connect to the guides. The body may be mounted to the support. Advantageously, the body provides connection between the support, second actuator and guides. Consequently, rotational movement of the support directly results in rotational movement of the body, and as a result, also the second actuator and guides connected thereto.

The guides may be suspended from the body. Advantageously, this allows the connection between the support and the guides to be provided at a position other than at the support. No further means for supporting the guides need be provided, which allows the end of the guides toward the plurality of lanes to remain unobstructed.

The second actuator may comprise a linear actuator. The second actuator may comprise a servomotor-driven belt drive.

The lengths of the guides may be variable. Thus, by suitable variation of the guide length, articles which travel along the guide channel are caused to remain within the guide channel for an extended time period. Advantageously, this facilitates switching of the diverter assembly from one of the plurality of lanes to another of the plurality of lanes without the need to introduce a gap into, or stop, the flow of articles. Each guide may comprise a first portion and a second portion. The two portions may be relatively movable to vary the length of the guide. Advantageously, this allows one portion to be fixed in position and the other portion to be relatively movable to vary the length of the guide.

The assembly may be operable to cause the length of the guides to vary as the guides pivot. Advantageously, this allows the diverter assembly to switch when an article is near the end of the guide channel.

Each guide may be telescopic. Advantageously, an inner part of the guide is thereby supported by an outer part of the guide and can extend smoothly therefrom. The guides may be parallel along at least a part of their length.

An upstream portion of the guide channel may comprise an entrance section wherein the guides are non-parallel. The downstream portion of the guide channel may comprise a guiding section wherein the guides are parallel. The upstream end of the entrance section may be wider than the guiding section. The upstream end of the entrance section may narrow toward the guiding section. Advantageously, the entrance section provides a wider opening for articles to enter the guide channel, and the guiding section ensures that the articles are correctly directed toward the selected one of the plurality of lanes.

The width of the guide channel may be adjustable. The body may comprise an adjustment frame. Thus, the assembly can accommodate articles of differing sizes and shapes.

The assembly may further comprise control apparatus. The control apparatus may comprise a processor and/or a memory. The control apparatus may be arranged to cause operation of the first actuator. The assembly may further comprise a sensor for detecting the presence or absence of an article. The control apparatus may be arranged to use the output of the sensor to determine when to cause the guides to pivot. Thus, the diverter assembly may be caused to switch between the plurality of lanes when articles are at a particular location within the guide channel which leads to successful and efficient switching. The control apparatus may be arranged to count the number of articles that pass the sensor. Thus, the diverter assembly may be caused to switch between the plurality of lanes when a predetermined number of articles have been diverted to a particular lane. The sensor may be mounted to the guides. A part of the sensor may be embedded within each guide. The sensor may be a photoelectric, break beam sensor.

The control apparatus may be arranged to use the output of the sensor to determine when to cause the guides to move radially relative to the axis of rotation of the support. Thus, the guides may be caused to move when articles are at a particular location within the guide channel which leads to successful and efficient switching. The control apparatus may be arranged to cause operation of the second actuator.

According to a second aspect of the present invention there is provided a conveyor apparatus comprising a diverter assembly and a conveyor, the diverter assembly being provided above the conveyor.

The second aspect of the present invention may comprise any or all of the features of the first aspect, as desired or as appropriate.

Such a construction is advantageous as the diverter assembly can be used to guide articles which travel along the conveyor.

The assembly may be operable such that, in use, the guides pivot as an article moves along the conveyor within the guide channel. The assembly may be operable to cause the guides to move radially relative to the axis of rotation of the support at the same speed as the conveyor. Advantageously, this results in an article travelling within the guide channel remaining within the guide channel as long as the guides continue to move.

The articles may be containers. The containers may be trays.

DETAILED DESCRIPTION OF THE INVENTION

In order that the invention may be more clearly understood one or more embodiments thereof will now be described, by way of example only, with reference to the accompanying drawings, of which:

Figure 1:
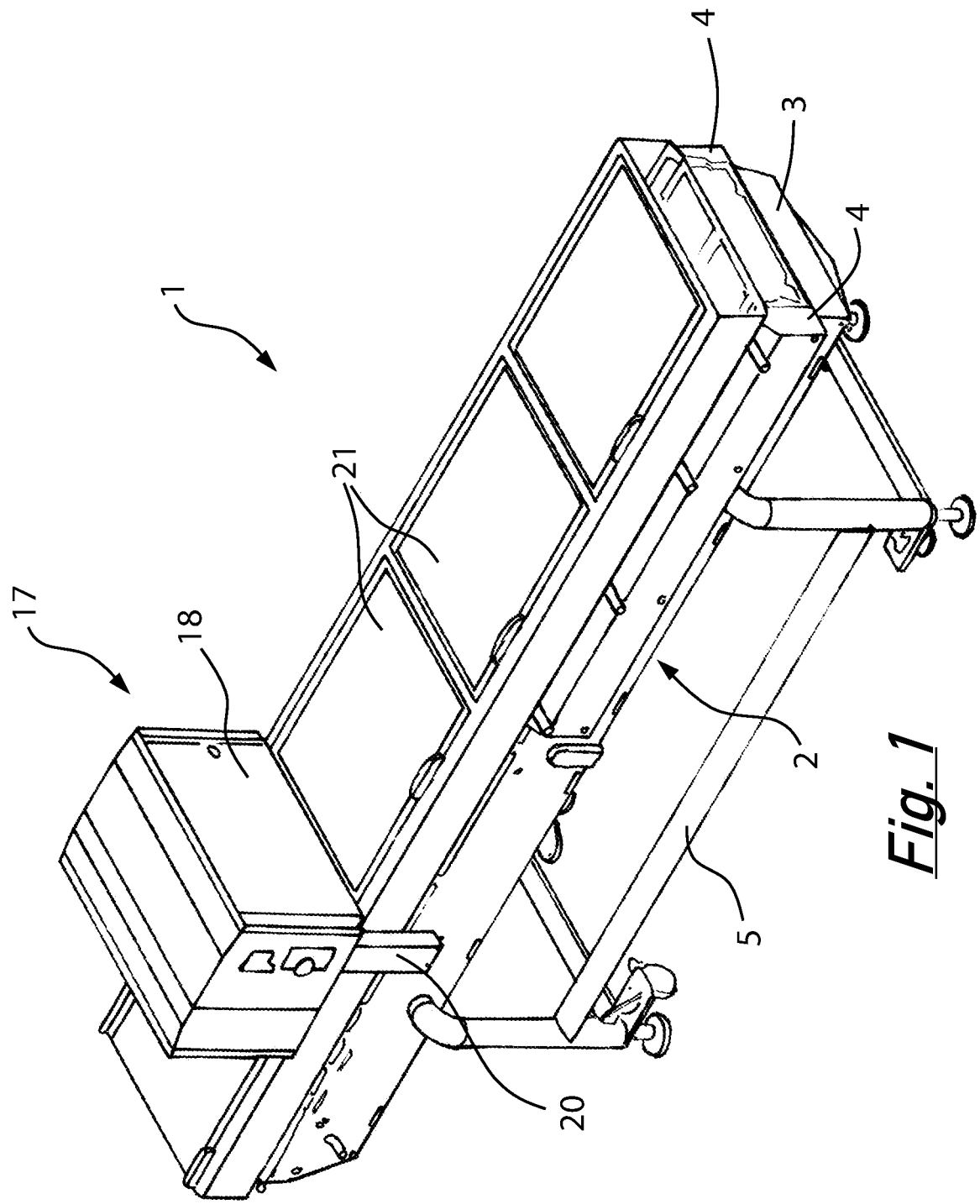
FIG. 1 is a perspective view of a conveyor apparatus with a diverter assembly.
Figure 2:
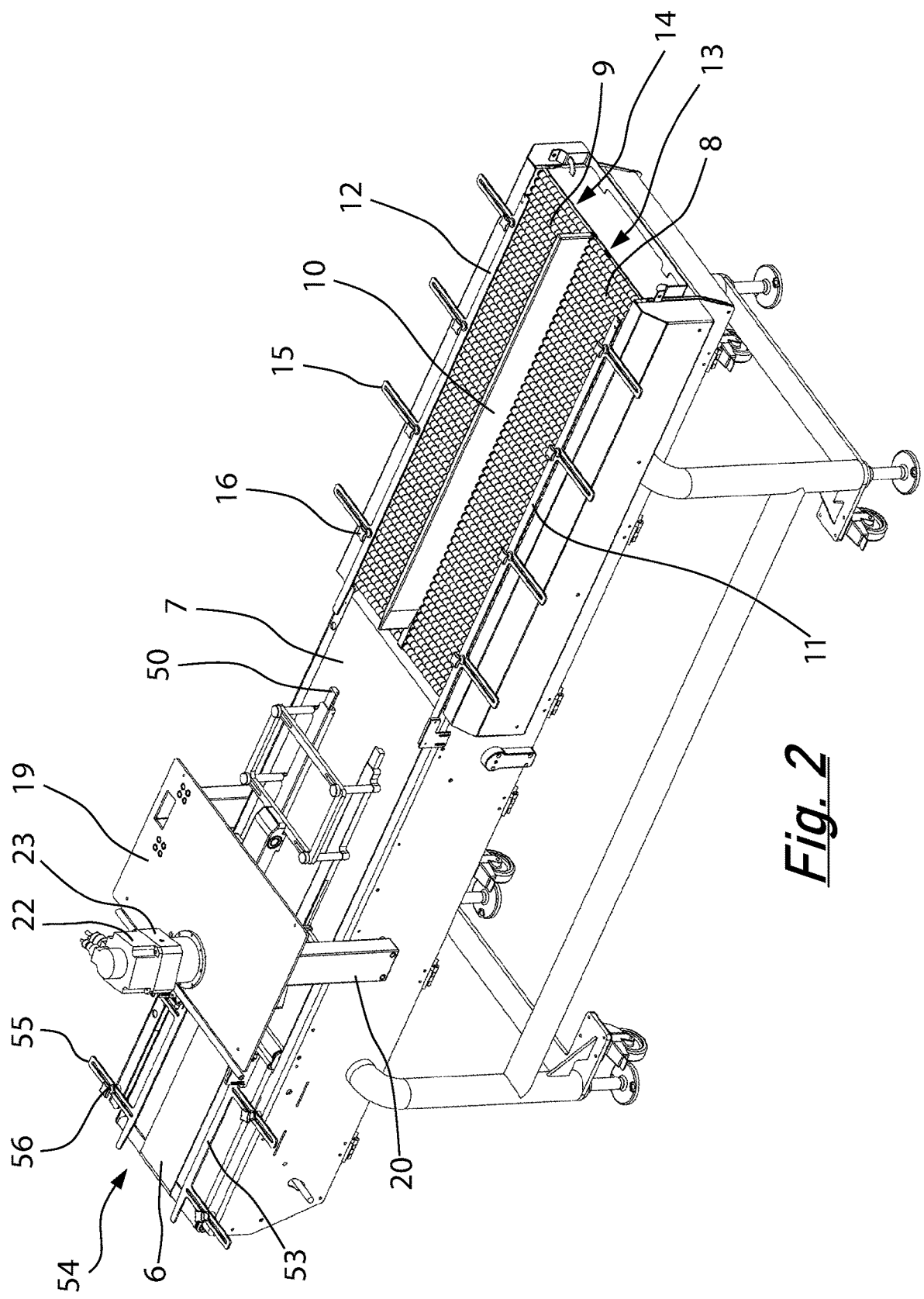
FIG. 2 is a perspective view of the conveyor apparatus of FIG. 1 with protective guards and cabinet cover removed.
Figure 3:
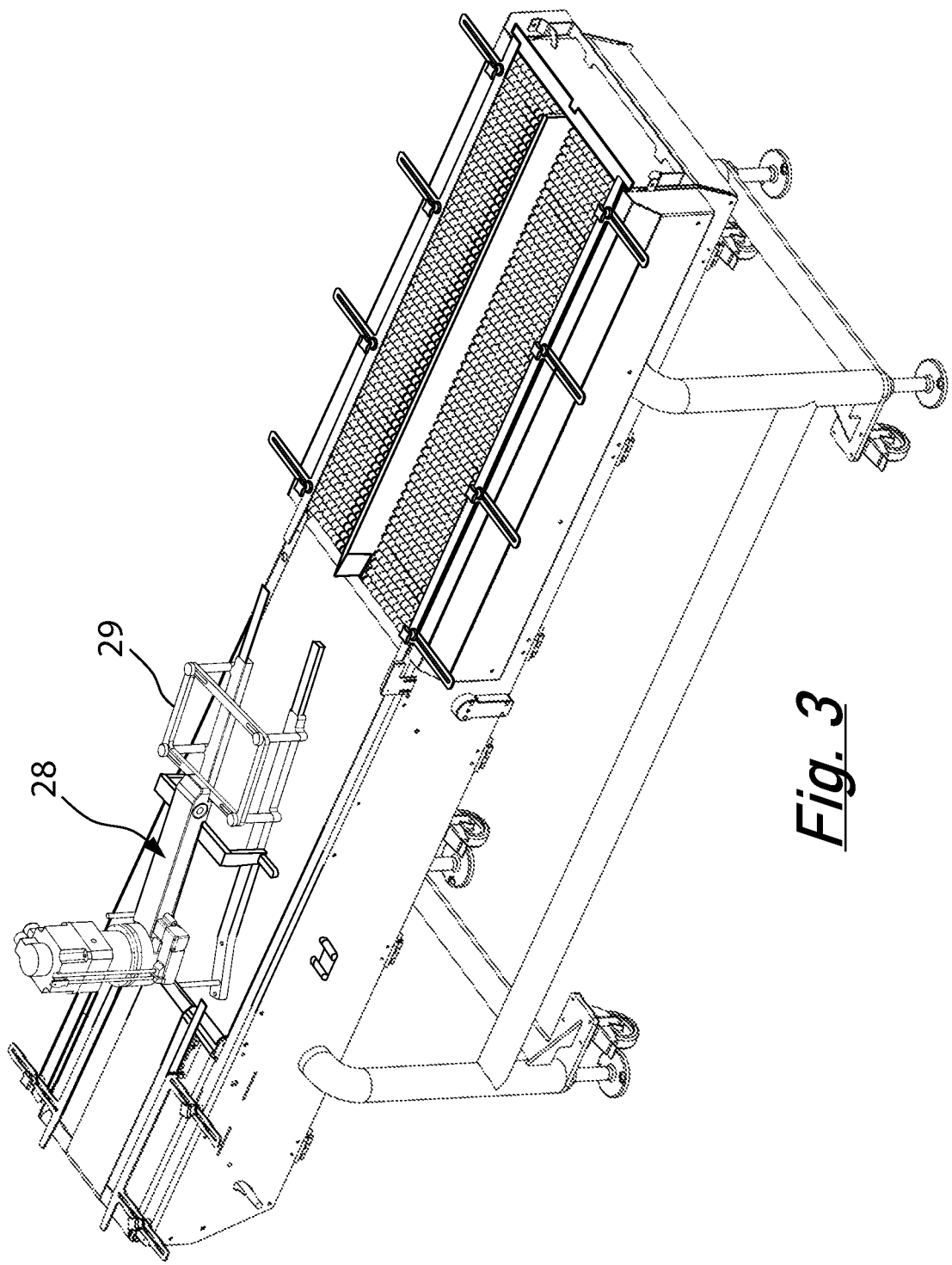
FIG. 3 is a perspective view of the conveyor apparatus of FIG. 2 with the cabinet base removed.
Figure 4:
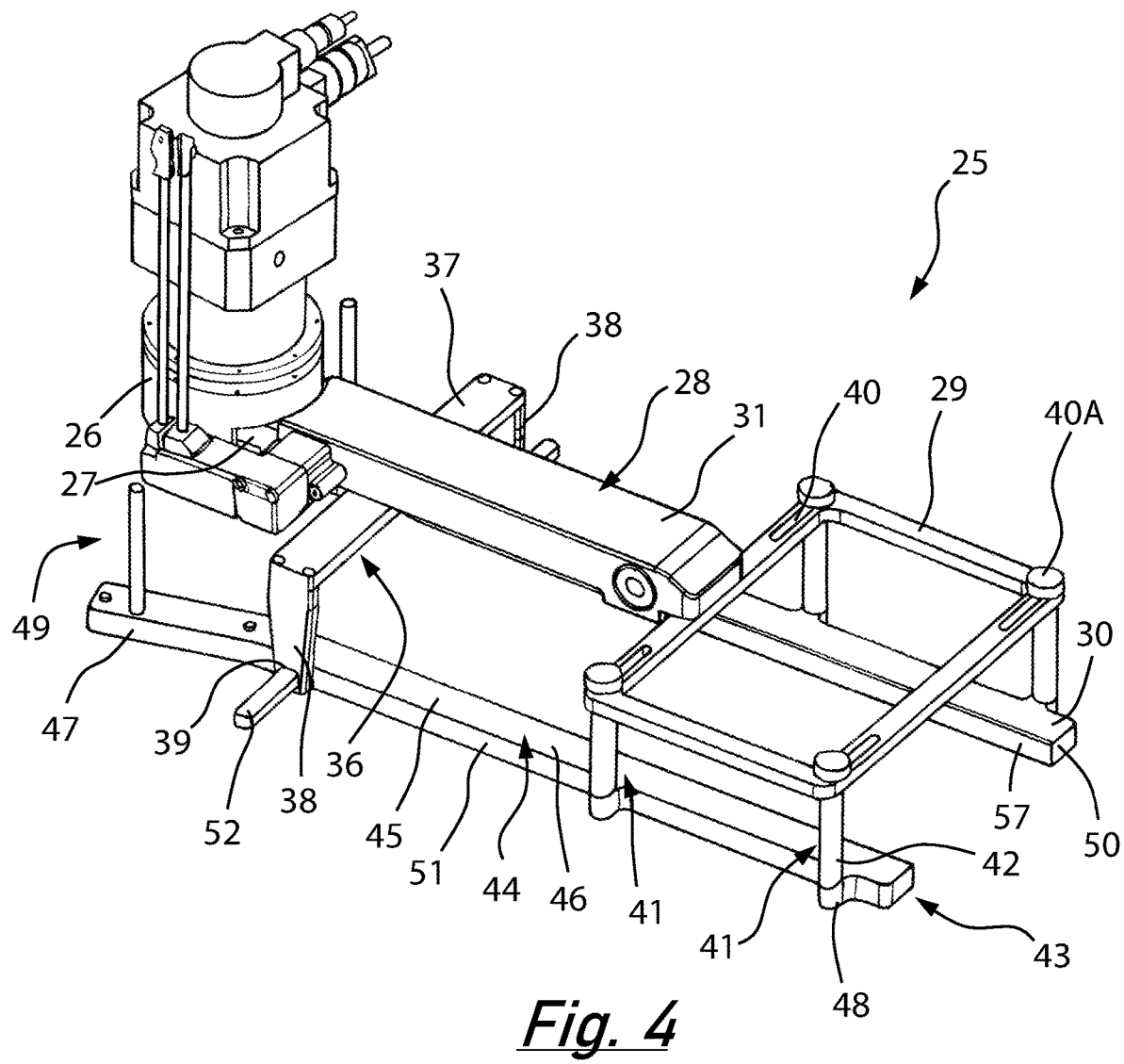
FIG. 4 is a perspective view of the diverter assembly.
Figure 5:
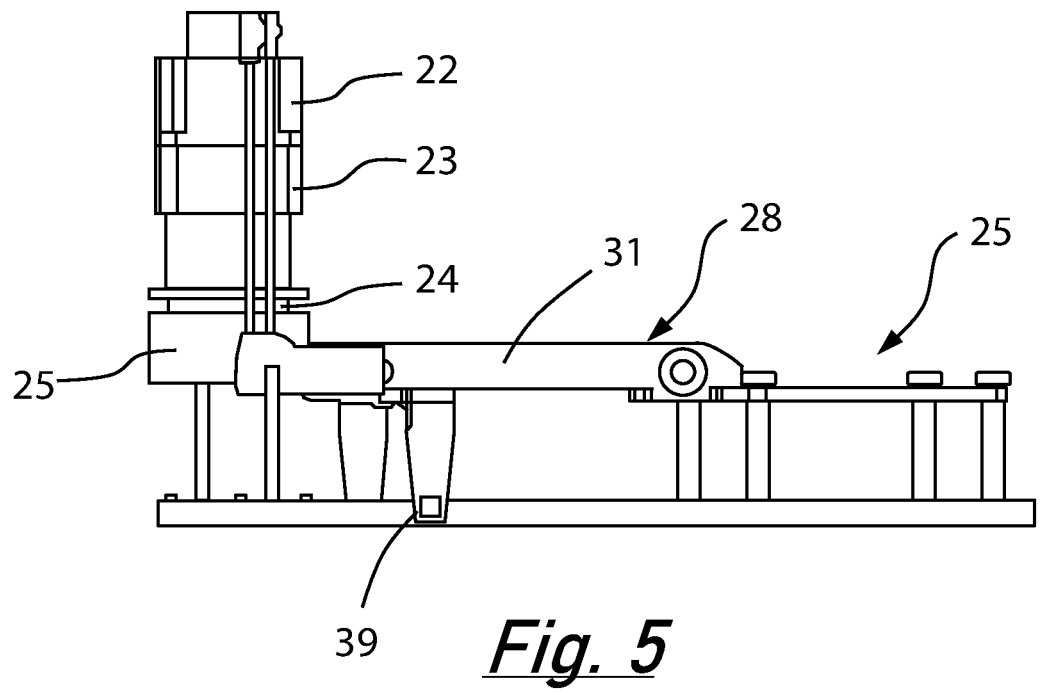
FIG. 5 is a view from the side and partly towards the rear of the diverter assembly of FIG. 4.
Figure 6:
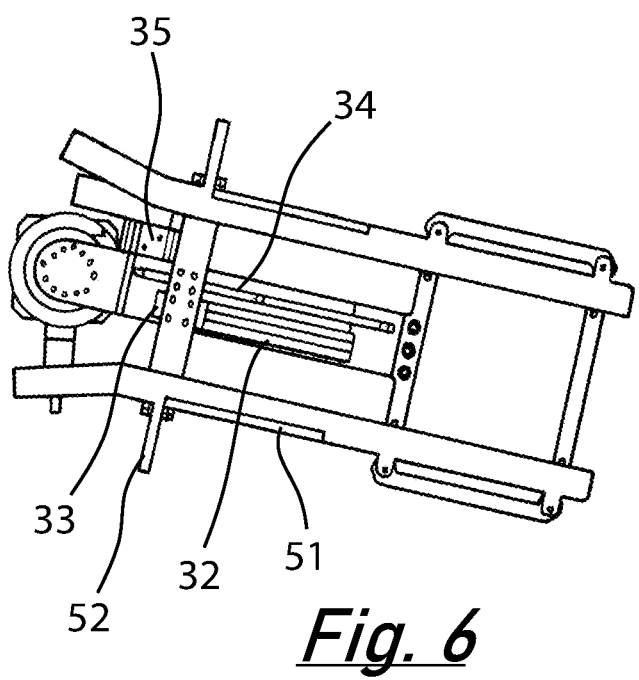
FIG. 6 is an under-plan view of the diverter assembly of FIG. 4 with the outer guides part cut away.

In what follows the terms upper, lower, top, bottom, left, right, upstream and downstream are used to refer to the conveyor apparatus and its components in the orientation in which it is illustrated, which is the orientation in which it is intended to be used, but should not be taken as otherwise limiting. Like reference numerals are used to denote like features throughout the drawings, which are not to scale.

Referring to the drawings, there is shown a conveyor apparatus 1. The conveyor apparatus comprises a main body formed of an elongate lower housing 2 having a base 3 and two sidewalls 4. The housing is supported from below by a frame 5.

The conveyor apparatus 1 is for conveying and diverting trays from one to a selected one of two lanes and comprises four servomotor driven conveyors 6, 7, 8, 9 mounted within the lower housing 2. The direction of travel of each conveyor is parallel to the elongate axis of the lower housing 2. All conveyors 6, 7, 8, 9 are substantially level and at the same height.

A first, infeed, conveyor 6 is mounted in the left side of the lower housing 2 and extends towards a second, switching, conveyor 7. The switching conveyor 7 is approximately twice as long as the infeed conveyor 6 and comprises a smooth surface to allow trays to be laterally diverted across its surface. The switching conveyor 7 extends to approximately the midpoint of the conveyor apparatus 1 as measured along the elongate axis of the lower housing 2, and extends in a direction parallel to the infeed conveyor 6 from a position adjacent the end of the infeed conveyor 6. The switching conveyor 7 extends toward two parallel, independent, outfeed conveyors 8, 9. The outfeed conveyors 8, 9 extend parallel to the switching conveyor 7 from a position adjacent the end of the switching conveyor 7 to the end of the lower housing 2. A central divider 10 separates the outfeed conveyors 8, 9. Each outfeed conveyor 8, 9 extends from the divider 10 to the respective housing sidewall 4.

An outfeed guide 11, 12 is provided above each outfeed conveyor 8, 9 to define two outfeed conveyor lanes 13, 14 between the divider 10 and the respective outfeed guide 11, 12. Each outfeed guide 11, 12 extends over the length of the outfeed conveyor 8, 9 and also projects slightly beyond the start of the outfeed conveyor onto the switching conveyor 7. Each outfeed guide 11, 12 is formed from a narrow, elongate strip of metal. Fingers 15 extend outwardly from the strip and an elongate slot is formed through each finger. A bolt 16 is received through the slot in each finger into a respective threaded bore in the lower housing 2 and is operable to releasably clamp the finger 15 to the lower housing 2. By this construction, each outfeed guide 11, 12 is adjustable to control the outfeed conveyor lane width.

A cabinet 17 comprising a cover 18 and a base 19 is spaced above the switching conveyor 7 toward the infeed conveyor end. The cover 18 sits on the base 19 which is supported by legs 20 which extend from the underside of the base 19 and are fastened to the outside of the sidewalls 4. The base 19 is formed from flat metal sheet, and is generally parallel to the upper surface of the switching conveyor 7. The cabinet 17 houses switchgear and programmable control apparatus. The programmable control apparatus comprises a processor connected with a memory (or other suitable storage means) and is appropriately programmed to cause the machine to perform the functions described herein.

In front of and behind the cabinet 17, above the conveyor upper surfaces, the conveyor apparatus is provided with openable protective guards 21 that extend across the infeed conveyor 6, the portion of the switching conveyor 7 not covered by the cabinet 17, and the outfeed conveyors 8, 9. The protective guards 21 connect to the lower housing 2 below and thereby surround the conveyors 6, 7, 8, 9 to protect workers from moving parts of the apparatus 1, but are openable to provide access to the conveyor surfaces for cleaning and maintenance.

A motor 22 and gearbox 23 are mounted inside the cabinet 17. An output shaft of the gearbox 23 is connected to or comprises a support 24 which extends through an aperture formed in the cabinet base 19. A diverter assembly 25 is connected to and supported by the support 24 for rotation with the support relative to the cabinet 17 and switching conveyor 7. The motor 22 and gearbox 23 provide a means for rotating the support 24.

The aperture formed in the cabinet base 19, through which the support 24 extends, is centred above the central elongate axis of the switching conveyor 7. In the present example, the motor 22 is an electric servomotor and the gearbox 23 is a planetary reduction gearbox, although the skilled person will appreciate that other means for rotatably mounting and driving the support 24 are also possible. Power to the motor 22 is under the control of the switchgear housed within the cabinet 17.

A hollow, part cylindrical cover 26 is mounted to the underside of the cabinet base 19, over the aperture and around the support 24. The shaft is accessible from the frontward facing portion of the cover 26 through a rectangular cut-out 27 formed therein.

The diverter assembly 25 is suspended above the switching conveyor 7 and extends from the support generally toward the plurality of lanes. The diverter assembly 25 comprises a central body 28, a rectangular adjustment frame 29, and a pair of telescopic guides 30.

The central body 28 is formed from an elongate housing 31, which is connected at its rear end to the support 24 and at its front end to the centre of a long side of the rectangular adjustment frame 29. The central body 28 extends through the cut-out 27 formed in the cylindrical cover 26.

A linear actuator is mounted in the central body housing 31. In the present example, the linear actuator comprises a rail 32 extending parallel to the elongate axis of the central body, a platform 33 slidably mounted to the rail 32, and a belt drive 34 operable to drive the platform along the rail 32. The platform 33 is accessible from the underside of the central body housing 31. A servomotor and gearbox, generally 35, are housed to one side of the central body housing 31 to operate the belt drive 34.

A yoke 36 comprises an elongate transverse member 37 and a pair of arms 38 projecting downwardly from the ends of the transverse member 37. The transverse member 37 is centrally mounted to the platform 33. As a result, when the platform 33 is driven along the rail 32, the yoke 36 is moved in a direction parallel to the elongate axis of the central body 28. A substantially rectangular aperture 39 is formed through the free end of each arm 38 of the yoke 36.

The rectangular adjustment frame 29 comprises four elongate slots 40 formed therethrough, each extending inwardly from a respective corner along a long side of the frame 29. A bolt 40A extends through each slot to engage a suspension rod 41 below. Each suspension rod 41 has an elongate, cylindrical body 42. Each bolt comprises a circular head and a threaded shaft, and each suspension rod 41 comprises a corresponding threaded bore formed in its flat, upper surface. The bolt heads have a diameter greater than the width of the slot 40. The threaded body has a maximum diameter that is less than the width of a slot 40 and a length that is slightly greater than the thickness of the frame 29. Thus, the bolts 40A can be inserted through the slots such that the end of the threaded body projects from the underside of the frame, but the head prevents the bolts 40A being pulled completely through the slots 40. The projecting part of threaded body engages the threaded bore. Thus, four suspension rods 41 are connected to the frame 29, two to each of the front left and front right of the central body 28. The bolt 40A can be tightened to secure the suspension rod 41 in position and can be released to allow for slidable adjustment of the rod position.

Each pair of rods 41 connects to one of the pair of telescopic guides 30 to suspend the guides 30 close to, but above, the surface of the switching conveyor 7.

The telescopic guides 30 are mirror opposites of each other. The telescopic guides 30 are substantially level.

Each telescopic guide 30 is elongate and comprises an outer guide 43 formed from a moulded plastic inner 44 and a metal casing 45 bolted to the plastic inner 44. The moulded plastic inner 44 has a first portion 46 having an elongate hollow profile portion and a second, solid, portion 47. The first portion 46 extends from slightly in front of the adjustment frame 29 backwardly to slightly beyond the maximum rearward extent of the rail 32 in the central body 28. The second portion 47 extends from the rear of the first portion 46 and is angled outwardly toward the edge of the switching conveyor 7.

In the present example, the first, hollow, portion 46 has a substantially rectangular outer and inner profile, but the skilled person will appreciate that other profile shapes are also suitable. The first portion 46 is open at its front face (that is, at the downstream end).

The metal casing 45 is formed from a rectangular metal sheet bent parallel to its long side at 90 degrees to cover the top surface and inwardly facing surface of the first portion 46 of the plastic inner 44. A pair of outward projections 48 project from the outer guide 43 at the downstream end, and the rods 41 connect to the upper surfaces of the projections 48. The rods 41 connect to the outer guides 43 so that the first portions 46 of the guides are parallel and are between the yoke arms 38. A guide channel 49 is thereby defined between the opposed, flat, inwardly facing surfaces of the telescopic guides 30 comprising a wider, entrance section, and a narrower, parallel, guiding section. Sliding the suspension rods 41 along the slots 40 controls the width of the guide channel 49.

A photoelectric, break beam sensor 57 is mounted near the downstream end of the outer guide 43. The sensor 57 comprises an emitter embedded within the plastic inner 44 of one of the outer guides 43 which emits a beam (typically of visible or infra-red light), through a hole formed in the metal casing 45 of the outer guide 43, directed toward the other guide. A receiver is embedded in the plastic inner 44 of the other outer guide 43, and a hole formed in the metal casing 45 of the outer guide 43 allows the beam to be received therethrough. The beam extends perpendicularly between the parallel guiding section of the guide channel 49 and is level.

The break-beam sensor 57 is connected to the control apparatus and is arranged to output a first signal thereto when the beam is detected by the receiver (indicating the absence of a tray in the line of sight of the sensor) and a second signal when the beam is "broken", and is therefore not detected by the receiver (indicating the presence of a tray in the line of sight of the sensor 57). The first signal may be an output from the sensor 57 and the second signal may be the absence of an output. The control apparatus is arranged to count the number of trays that pass the sensor 57. Of course, the person skilled in the art will appreciate that an alternative proximity sensor may be employed to detect the presence or absence of a tray, including, but not limited to, radiation, pressure and/or acoustic sensors.

An inner guide 50 having an outer cross section corresponding to the inner cross section of the hollow outer guide 43 is received in each outer guide 43 with a close sliding fit. The inner guides 50 are also formed from moulded plastic and the inwardly facing surface of each inner guide 50 is flat. The inner guide 50 is elongate and is substantially the same length as the first, hollow, portion 46 of the outer guide 43. The telescopic guides 30 are operated to move between a retracted position, in which the inner guide 50 does not project beyond the open front face of the outer guide 43, and an extended position, in which the inner guide 50 projects beyond the outer guide 43 to increase the length of the guiding section of the guide channel 49. A slot 51 formed through and along the outwardly facing surface of the outer guide 43 at its upstream end allows an arm 52 to be attached to the side of the inner guide 50 toward its rear. The arm 52 can be slid along the slot 51 to cause the inner guide 50 to move relative to the outer guide 43.

Each arm 52 is received in a respective aperture 39 in the yoke 36. The outward extension of the arm 52 is such that the variation in separation of the telescopic guides 30 obtainable by sliding the rods 41 through the frame 29 does not result in the yoke 36 and arms 52 becoming disconnected. As a result, when the yoke 36 is driven along the rail 32 by the belt drive 34, the arm 52 is also driven and thus the inner guide 50 is operated to telescope into and out of the front face of the outer guide 43.

A pair of infeed guides 53 are provided above and at either side of the infeed conveyor 6 to define an infeed conveyor lane 54 between the infeed guides 53. Each infeed guide 53 extends the length of the infeed conveyor 6 and also projects slightly beyond the end of the infeed conveyor 6 onto the switching conveyor 7. Each infeed guide 53 is formed from a narrow, elongate strip of metal. Fingers 55 extend outwardly from the strip and a channel is formed through each. A bolt 56 is received through the channel in each finger 55 and is operable to releasably clamp the finger 55 to the lower housing 2. By this construction, each infeed guide 53 is adjustable to control the infeed conveyor lane width.

The control apparatus controls the operation of the servomotors. Each servomotor comprises an encoder, which outputs a pulsed signal to the control apparatus representative of the motion of the servomotor. The control apparatus monitors the motion of the servomotor by counting pulses output by the encoder, and uses this information to determine the position, speed and like information relating to the motion of each servomotor.

Figure 7:
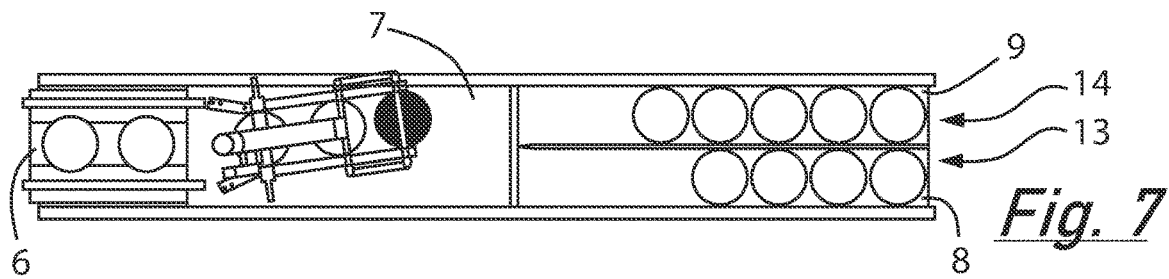
FIGS. 7-12 are schematic plan views of part of the apparatus in different sequential states during operation.

In operation, the infeed conveyor 6 advances trays between the infeed guides 53 toward the switching conveyor 7. The infeed conveyor 6 and switching conveyor 7 are operated at substantially the same speed. The control apparatus causes the diverter assembly 25 to rotate to a first, predetermined, angle so that the guiding section of the telescopic guides 30 points toward one of the two outfeed conveyor lanes 14 (the "first outfeed conveyor lane"). In this position, the telescopic guides 30 are not extended. Trays pass from the infeed conveyor 6 onto the switching conveyor 7 where they enter the wider entrance section of the guide channel 49 between the telescopic guides 30 and are funnelled into the guiding section. The telescopic guides 30 laterally divert the trays as they travel along the switching conveyor 7 so they enter the first outfeed conveyor lane 14, as is shown in FIG. 7.

As trays travel along the switching conveyor 7 and are diverted to the first outfeed conveyor lane 14, the control apparatus counts the number of trays that pass the sensor 57. Once a predetermined number of trays, say, three trays, have been diverted to the first outfeed conveyor lane 14, the diverter assembly 25 is caused to switch to the other outfeed lane 13 (the "second outfeed conveyor lane") when the following tray reaches the downstream end of the outer guide 43. In the present example, the control apparatus determines when the fourth tray reaches the downstream end of the outer guide 43 by monitoring when the sensor beam is broken by the fourth tray. However, the person skilled in the art will appreciate that this may also be achieved by measuring the gaps between trays and monitoring the servomotor encoders.

Figure 8:
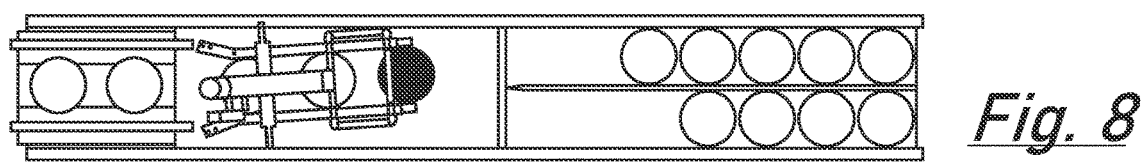
Figure 9:
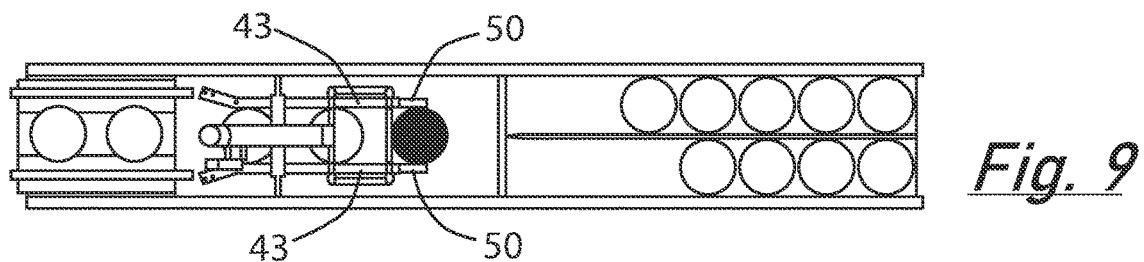
Figure 10:
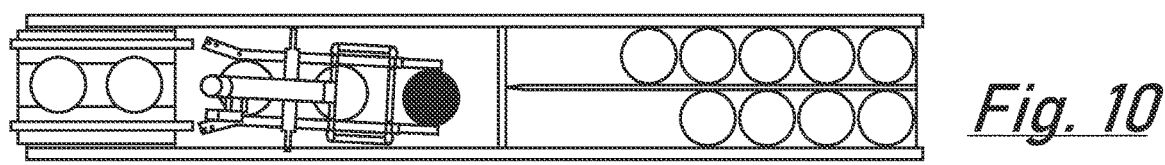
Figure 11:
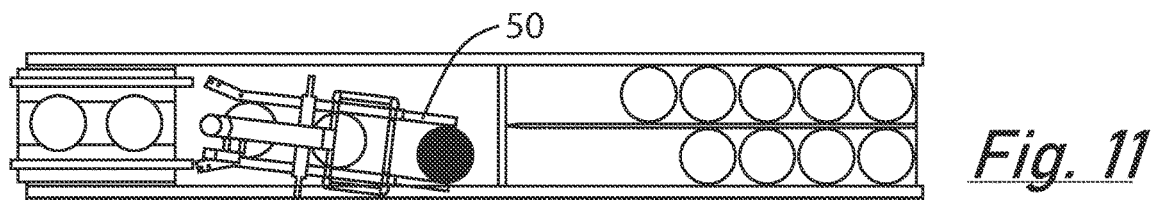

The fourth tray is advanced to the end of the, still retracted, telescopic guides 30, as is shown in FIG. 8. When the fourth tray breaks the beam of the sensor 57, without pausing the switching conveyor 7, the control apparatus causes the diverter assembly 25 to rotate to a second, predetermined, angle so that the telescopic guides 30 cause containers to enter the second outfeed conveyor lane 13. As the diverter assembly 25 rotates, the control apparatus also causes the yoke 36 to be driven forward along the rail 32, causing the inner guide to extend from the outer guide. The yoke 36 is driven along the rail 32 at about the same linear velocity as the switching conveyor 7. Consequently, as the fourth tray reaches the end of the telescopic guide 30 and the diverter assembly 25 begins to rotate, the fourth tray continues to progress along the switching conveyor 7 whilst being guided by the inner guides 50 until the diverter assembly 25 has rotated to the second angle, as is shown in FIGS. 8-11. The fourth tray then enters the second outfeed conveyor lane 13.

Figure 12:
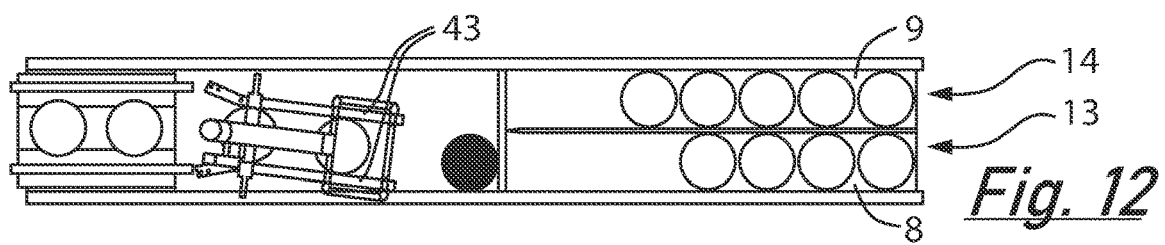

The control apparatus then causes the yoke 36 to be driven backward along the rail 32, retracting the inner guide 50 back into the outer guide 43, as is shown in FIG. 12. The fourth tray advances along the remainder of the switching conveyor 7 before entering the second outfeed conveyor lane 13 to travel along the outfeed conveyor 8 and out of the machine.

The control apparatus continues to record the number of trays which pass the sensor 57, and a further two trays are diverted into the second outfeed conveyor lane 13 before the control apparatus causes the diverter assembly 25 to rotate from the second angle back to the first angle, in an identical manner to that described above in relation to the rotation from the first angle to the second angle.

The one or more embodiments are described above by way of example only. Many variations are possible without departing from the scope of protection afforded by the appended claims.

The invention claimed is:

1. A diverter assembly for guiding articles disposed on a moving surface from a single lane to one of a plurality of lanes, the assembly comprising: a pair of spaced apart guides spaced above the moving surface and defining a guide channel therebetween, the guides being connected to a support mounted to a rotatable shaft, a first actuator operable to rotate the shaft to thereby pivot the guides by rotation of the support and thus cause articles to be guided to a selected one of the plurality of lanes wherein the width of the guide channel is adjustable; wherein the assembly is operable to cause at least part of the guides to move radially relative to the axis of rotation of the shaft as the guides pivot.

2. A diverter assembly as claimed in claim 1 wherein the guides are substantially supported by the support.

3. A diverter assembly as claimed in claim 1, further comprising a control apparatus arranged to cause operation of the first actuator, and a sensor for detecting the presence or absence of a tray, the control apparatus being arranged to use the output of the sensor to determine when to cause the guides to pivot.

4. A diverter assembly as claimed in claim 1 wherein the support is positioned above the guides.

5. A diverter assembly as claimed in claim 1 wherein each guide is telescopic.

6. A diverter assembly as claimed in claim 1 wherein the guides are parallel along at least a part of their length.

7. A conveyor apparatus comprising a diverter assembly as claimed in claim 1 and a conveyor comprising the moving surface, the diverter assembly being provided spaced above the conveyor.

8. A conveyor apparatus as claimed in claim 7 wherein the assembly is operable such that, in use, the guides pivot as an article moves along the conveyor within the guide channel.

9. A diverter assembly for guiding articles from a single lane to one of a plurality of lanes, the assembly comprising: a pair of spaced apart guides defining a guide channel therebetween, the guides being connected to a rotatably mounted support mounted in a fixed location towards the single lane; a first actuator operable to rotate the support to thereby pivot the guides by rotation of the support and thus cause articles to be guided to a selected one of the plurality of lanes wherein the width of the guide channel is adjustable; a second actuator connected to the guides and operable to cause the at least part of the guides to move radially relative to the axis of rotation of the support; and wherein the second actuator is mounted to the support for rotation with the support.

10. A diverter assembly for guiding articles from a single lane to one of a plurality of lanes, the assembly comprising: a pair of spaced apart guides defining a guide channel therebetween, the guides being connected to a rotatably mounted support mounted in a fixed location towards the single lane: a first actuator operable to rotate the support to thereby pivot the guides by rotation of the support and thus cause articles to be guided to a selected one of the plurality of lanes wherein the width of the guide channel is adjustable; a second actuator connected to the guides and operable to cause the at least part of the guides to move radially relative to the axis of rotation of the support; and wherein a yoke is movably mounted to the second actuator and at least part of the guides are connected to the yoke.

11. A diverter assembly for guiding articles disposed on a moving surface from a single lane to one of a plurality of lanes, the assembly comprising:
a pair of spaced apart guides defining a guide channel therebetween, the guides being connected to a support mounted in a fixed location towards the single lane, with the guides spaced above the moving surface by the rotatably mounted support, and a first actuator operable to rotate the support to thereby pivot the guides by rotation of the support and thus cause articles to be guided to a selected one of the plurality of lanes wherein the width of the guide channel is adjustable; and
further comprising a second actuator connected to the guides and operable to cause the at least part of the guides to move radially relative to the axis of rotation of the shaft.

12. A diverter assembly as claimed in claim 11 wherein:
the second actuator is housed in a body, and a part of the body connects to the guides; and
the guides are suspended from the body.

13. A diverter assembly as claimed in claim 11 wherein the second actuator comprises a linear actuator.

14. A diverter assembly as claimed in claim 11 wherein the second actuator is substantially supported by the support.

15. A conveyor apparatus comprising:
a diverter assembly for guiding articles disposed on a moving surface from a single lane to one of a plurality of lanes, the diverter assembly comprising: a pair of spaced apart guides defining a guide channel therebetween, the guides being connected to a support mounted in a fixed location towards the single lane, with the guides spaced above the moving surface by the rotatably mounted support, and a first actuator operable to rotate the support to thereby pivot the guides by rotation of the support and thus cause articles to be guided to a selected one of the plurality of lanes wherein the width of the guide channel is adjustable;

a conveyor comprising the moving surface, the diverter assembly being provided spaced above the conveyor; and wherein the diverter assembly is operable to cause the guides to move radially relative to the axis of rotation of the support at the same speed as the conveyor.

16. A diverter assembly for guiding articles disposed on a moving surface from a single lane to one of a plurality of lanes, the assembly comprising: a pair of spaced apart guides spaced above the moving surface and defining a guide channel therebetween, the guides being connected to a support mounted to a rotatable shaft, a first actuator operable to rotate the shaft to thereby pivot the guides by rotation of the support and thus cause articles to be guided to a selected one of the plurality of lanes wherein the width of the guide channel is adjustable; wherein each guide comprises a first portion and a second portion, the two portions being relatively movable to vary the length of the guide; wherein the assembly is operable to cause the length of the guides to vary as the guides pivot.

17. A diverter assembly for guiding articles from a single lane to one of a plurality of lanes, the assembly comprising: a pair of spaced apart guides defining a guide channel therebetween, the guides being connected to a rotatably mounted support mounted in a fixed location towards the single lane, and a first actuator operable to rotate the support to thereby pivot the guides by rotation of the support and thus cause articles to be guided to a selected one of the plurality of lanes, and wherein an upstream portion of the guide channel comprises an entrance section wherein the guides are non-parallel, and the downstream portion of the guide channel comprises a guiding section wherein the guides are parallel, the upstream end of the entrance section being wider than the guiding section and narrowing toward the guiding section; wherein the assembly is operable to cause at least part of the guides to move radially relative to the axis of rotation of the support as the guides pivot.

* * * * *